May 4, 1943.  S. P. THACHER ET AL  2,318,340
STATIC ELIMINATOR FOR VEHICLES
Filed April 2, 1940

INVENTORS
SHELDON P. THACHER
AND GLENN G. HAVENS
BY Lester J. Beedling
ATTORNEY

UNITED STATES PATENT OFFICE 2,318,340

STATIC ELIMINATOR FOR VEHICLES

Sheldon P. Thacher, Grosse Pointe, and Glenn G. Havens, Detroit, Mich., assignors to United States Rubber Company, New York, N. Y., a corporation of New Jersey Application April 2, 1940, Serial No. 327,452

1 Claim. (Cl. 175—264)

Our invention relates to automotive vehicles and, in particular, to means for discharging accumulations of static electricity therefrom.

Automotive vehicles, supported on conventional rubber tires, have a tendency to accumulate charges of static electricity. A discharge of such accumulated static electricity is retarded by the very nature of the rubber tires on which such vehicles ride.

In recent years, the improved compounding of tires has resulted in higher insulating characteristics and, therefore, the retention of static in the vehicle is more pronounced. In some cases such accumulations of static electricity have been of the order of 10,000 volts, and an individual touching the charged car received a distinctly uncomfortable shock. In some rare cases physical injury has resulted directly or indirectly therefrom. The discharge of any such accumulated charge by a spark of any order at a gasoline filling station is dangerous. Due to the insulation characteristics of tires, the accumulated static within the vehicle is retained for a period of several hours.

We provide means for discharging such accumulated electricity immediately upon an automotive vehicle coming to rest, which means are normally inoperative at conventional driving speeds. Specifically, we provide a strip of electrically conducting rubber which is attached to the framework of the automobile so as to come into contact with the ground or road surface when the vehicle comes to rest, but which is left out of engagement by wind resistance at conventional speeds such as 20 miles per hour or more.

The accompanying drawing illustrates a present preferred embodiment of our invention, in which Fig. 1 is a view, in dot and dash line, of an automotive vehicle equipped with a static discharging device;

Figure 1:
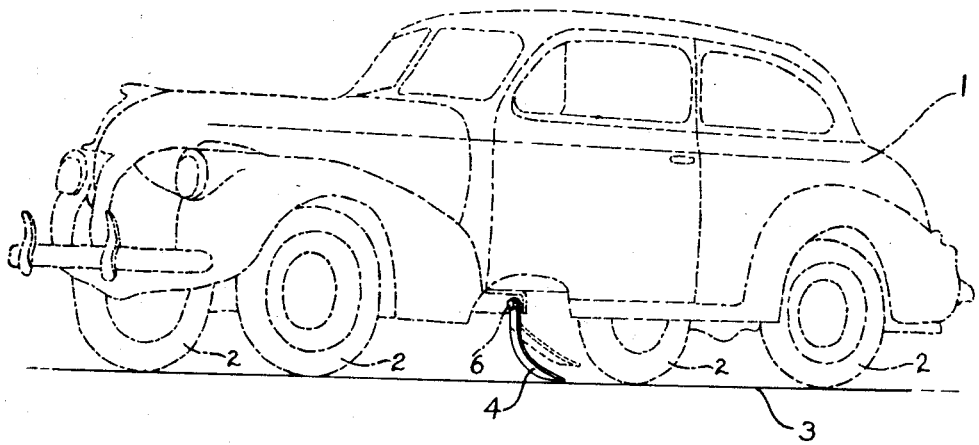
Figure 2:
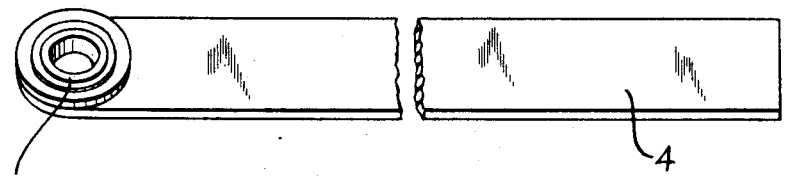
Fig. 2 is a perspective view of the static discharging device.

Referring to the drawing, we show a diagrammatical view of an automotive vehicle 1 on conventional pneumatic tires 2, containing considerable bodies of rubber and having bodies of tread rubber directly in engagement with the roadway 3. Attached to the under-surface of the vehicle is a strip 4 of rubber composition having a grommett 5 crimped in one end thereof for engagement with a bolt 6. The bolt 6 may be any accessible bolt on the under-surface of the vehicle, or it may be a special bolt substituted therefor.

Figure 3:
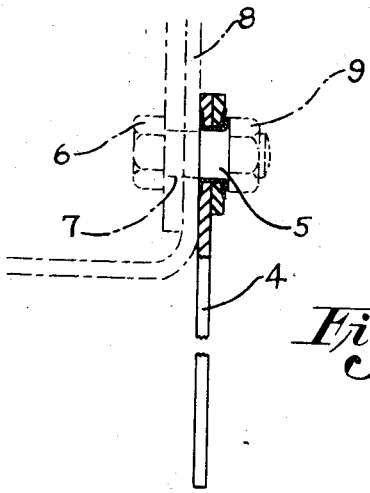
Fig. 3 is a view, partially in section, illustrating one form of attaching a static discharging device.

Fig. 3 illustrates in greater detail the bolt 6 passing through an opening 7 in any structural piece 8 of the vehicle. A conventional nut 9 is threaded on to the end of the bolt 6 for engagement with the grommet 5, confining the strip 4 at one end while leaving the other end free.

Preferably, the strip 4 is made of a tough, flexible rubber composition, compounded to have a relatively low electrical resistance, as considered with respect to the rubber working art. Specifically, such a strip of rubber 1 inch wide, $\frac{1}{16}$ inch thick, and 16 inches long has a resistance of the order of 0.2 megohm. However, satisfactory results in discharging static can be obtained by such a strip having a resistance in the order of 1,000 megohms. Such a rubber strip can be compounded by utilizing certain types of carbon black which have been specially prepared for this purpose. One suitable type of carbon black is that derived from acetylene, as distinguished from natural gas, unless the latter has been specially treated.

In the operation of the vehicle 1, the strip 4 is sufficiently long to present a good wearing surface against the roadway 3 when the vehicle is at rest. However, when the vehicle is moving, for example, at a speed of 20 or more miles per hour, the wind resistance is sufficiently great to lift the free end of the strip 4 from the road surface and permit it to flap or float on the air. An occasional contact between the strip and road surface is not objectionable, but continuous engagement between the strip and the road surface results in undue wear on the strip; furthermore, when the car is in motion, the presence of the static charge therein is not dangerous or uncomfortable to the occupants of the car. When the vehicle slows down or comes to rest, the force of gravity acts to bring the end of the strip immediately into engagement with the road, when an electrical circuit is completed from the vehicle frame, through the bolt 6, grommet 5, and strip 4 to the ground. Accordingly, the accumulated static is automatically discharged.

The strip also is silent in comparison with a dragging chain or wire, such as has heretofore been used, and the wearing life of a strip of rubber will by far exceed the wearing life of metallic articles adaptable for dragging on road surfaces to discharge static.

While we have shown and described a preferred embodiment of our invention, it is to be understood that it is susceptible of modifications, as included in the scope of the appended claim.

Having thus described our invention, what we claim and desire to protect by Letters Patent is:

The combination of an automotive vehicle having rubber tires acting as electrical resistors between the vehicle body and the road and of a strip of flexible, rubberized material rigidly attached to the vehicle body, forming an electrical circuit therewith and being of a length and width sufficient to engage the road surface when the vehicle is at rest and of sufficient flexibility to be removed from road contact when the vehicle is operating at normal speeds.

SHELDON P. THACHER.
GLENN G. HAVENS.